(12) United States Patent
Gillinger

(10) Patent No.: US 11,788,864 B2
(45) Date of Patent: Oct. 17, 2023

(54) DETERMINATION OF AN ITEM OF POSITION INFORMATION RELATING TO A POSITION OF A MAGNETIC FIELD TRANSDUCER RELATIVE TO A POSITION SENSOR

(71) Applicant: Infineon Technologies AG, Neubiberg (DE)

(72) Inventor: Manuel Gillinger, Feldkirchen (AT)

(73) Assignee: Infineon Technologies AG, Neubiberg (DE)

( * ) Notice: Subject to any disclaimer, the term of this patent is extended or adjusted under 35 U.S.C. 154(b) by 394 days.

(21) Appl. No.: 17/247,146

(22) Filed: Dec. 1, 2020

(65) Prior Publication Data

US 2021/0164807 A1  Jun. 3, 2021

(30) Foreign Application Priority Data

Dec. 2, 2019  (DE) .......................... 102019218702.1

(51) Int. Cl.
| | | |
|---|---|---|
| *G01D 5/14* | (2006.01) | |
| *G01D 5/244* | (2006.01) | |
| *G01D 18/00* | (2006.01) | |

(52) U.S. Cl.
CPC .......... *G01D 5/145* (2013.01); *G01D 5/24476* (2013.01); *G01D 5/24495* (2013.01); *G01D 18/001* (2021.05)

(58) Field of Classification Search
CPC ... G01D 5/145; G01D 18/001; G01D 5/24476
See application file for complete search history.

(56) References Cited

U.S. PATENT DOCUMENTS

| | | | |
|---|---|---|---|
| 11,255,700 B2* | 2/2022 | Lassalle-Balier | ........................... G01R 33/0094 |
| 2010/0321008 A1* | 12/2010 | Mita | ..................... G01D 5/145 324/207.25 |
| 2021/0095999 A1* | 4/2021 | Ausserlechner | ......... G01B 7/30 |

FOREIGN PATENT DOCUMENTS

| | | |
|---|---|---|
| CN | 102156033 A | 8/2011 |
| CN | 107588952 A | 1/2018 |
| CN | 109145886 A | 1/2019 |
| DE | 19914447 A1 | 10/1999 |
| DE | 10163504 A1 | 7/2003 |

(Continued)

*Primary Examiner* — Reena Aurora
(74) *Attorney, Agent, or Firm* — Harrity & Harrity, LLP

(57) ABSTRACT

An apparatus for determining an item of position information relating to a position of a magnetic field transducer relative to a position sensor. The position sensor is designed to generate at least one periodic measurement signal when the magnetic field transducer moves relative to the position sensor. A processing unit of the apparatus is designed to determine the position information based on a respective measurement signal value of a respective periodic measurement signal using a calibration function assigned to the respective periodic measurement signal. The assigned calibration function represents the respective periodic measurement signal using a Fourier series having a respective plurality of Fourier coefficients which differ from zero and are of an order greater than zero. The processing unit is designed to at least approximately solve the assigned calibration function for the respective measurement signal value in order to determine the position information.

21 Claims, 11 Drawing Sheets

(56) References Cited

FOREIGN PATENT DOCUMENTS

| | | |
|---|---|---|
| DE | 102004038621 B3 | 2/2006 |
| DE | 112006003663 B4 | 9/2015 |
| DE | 102016112670 A1 | 2/2017 |
| DE | 102017128891 A1 | 6/2019 |
| EP | 2110639 A1 | 10/2009 |
| JP | 2004-325140 A | 11/2004 |
| WO | 2016/116272 A2 | 7/2016 |

* cited by examiner

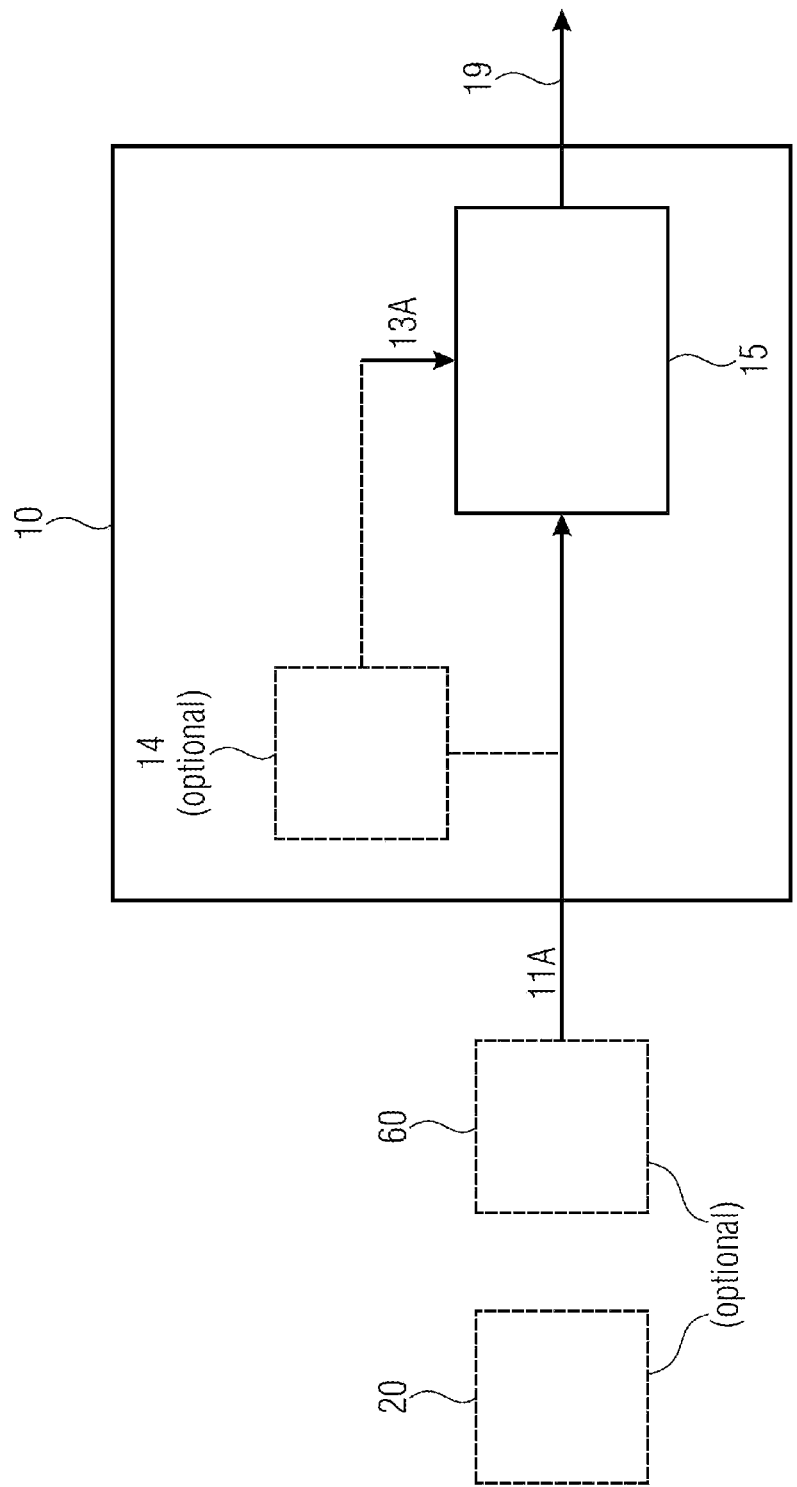

DETERMINATION OF AN ITEM OF
POSITION INFORMATION RELATING TO A
POSITION OF A MAGNETIC FIELD
TRANSDUCER RELATIVE TO A POSITION
SENSOR

CROSS REFERENCE TO RELATED APPLICATION

This application claims priority to German Patent Application No. 102019218702.1 filed on Dec. 2, 2019, the content of which is incorporated by reference herein in its entirety.

DESCRIPTION

The present disclosure deals with apparatuses and methods for determining an item of position information relating to a position of a magnetic field transducer relative to a position sensor, wherein the position sensor is designed to generate at least one periodic measurement signal when the magnetic field transducer moves relative to the position sensor. The present disclosure also relates to a position sensor.

BACKGROUND

Position sensors are used to measure a position or a movement of a magnetic field transducer relative to the position sensor. Examples of position sensors have magnetic field sensors, such as xMR sensors or Hall sensors, wherein xMR denotes different magnetoresistive effects such as AMR (anisotropic magnetoresistance), GMR (GMR=giant magnetoresistance) and TMR (TMR=tunnel magnetoresistance). These position sensors provide a measurement signal which is proportional to an applied magnetic field. The magnetic field transducer may have one or more pole pairs, for example, with the result that the position sensor generates an oscillation signal, which fluctuates around a mean value, in the event of a relative movement between the position sensor and the magnetic field transducer.

Such position sensors are used, for example, in sensor systems which capture an angular position of a rotating shaft. Examples of such sensor systems are so-called "out-of-shaft" sensor systems in which the position sensor is arranged outside the shaft, for example beside the shaft. In the case of so-called "end-of-shaft" or "integrated end-of-shaft" sensor systems, the position sensor can be arranged at the end of the shaft. In particular, "out-of-shaft" sensor systems can also be used when the axis of rotation is not accessible. In the case of sensor systems for capturing an angular position, a magnetic field transducer having one or a plurality of pole pairs may be arranged on the axis of rotation, wherein the magnetic poles may be arranged alternately in the direction of rotation, with the result that the magnetic field transducer generates a varying, for example a periodic, magnetic field during a rotation of the axis of rotation, which magnetic field is captured by the position sensor.

Magnetic synchros are currently used in such sensor systems as position sensors. For this purpose, a specially shaped ring made of a paramagnetic material is fastened to the axis of rotation. The ring rotates inside an arrangement of two arrangements of coils. The first arrangement of coils generates an alternating magnetic field, while the second arrangement of coils detects the alternating magnetic field. Magnetic coupling between the two arrangements of coils is modulated by the angular position of the paramagnetic ring. In a similar manner to the core of a transformer, the coupling changes depending on whether more or less of the paramagnetic material of the ring is situated between the two arrangements of coils. The rotor, or a part of the latter, modulates the air gap between the exciting and the receiving coils. It may therefore be necessary to precisely arrange the stator, for example the coils, and the rotor, for example the rotating shaft. In addition, special assembly parts, for example rings, sleeves, screws, are used to permanently fix the stator and rotor parts.

The properties imposed on position sensors for use in such sensor systems generally usually lie in a high degree of robustness with respect to stray fields and a high degree of accuracy of the measured angle.

OVERVIEW

A concept for determining an item of position information relating to a position of a magnetic field transducer relative to a position sensor would is described herein, which concept makes it possible to permanently determine the position information as consistently as possible and as precisely as possible and, at the same time, enables a design of the position sensor which is as simple, space-saving and cost-effective as possible.

Examples of the present disclosure provide an apparatus for determining an item of position information relating to a position of a magnetic field transducer relative to a position sensor, wherein the position sensor is designed to generate at least one periodic measurement signal when the magnetic field transducer moves relative to the position sensor. The apparatus has a processing unit which is designed to determine the position information on the basis of a respective measurement signal value of a respective periodic measurement signal using a calibration function assigned to the respective periodic measurement signal. In this case, the assigned calibration function represents the respective periodic measurement signal using a Fourier series having a respective plurality of Fourier coefficients which differ from zero and are of an order greater than zero. Furthermore, the Fourier coefficients are determined on the basis of a respective multiplicity of measurement signal values of the respective periodic measurement signal. The processing unit is designed to at least approximately solve the assigned calibration function for the respective measurement signal value in order to determine the position information.

Examples of the present disclosure are based on the knowledge that the use of a calibration function which represents the periodic measurement signal using a Fourier series having a plurality of Fourier coefficients which differ from zero makes it possible to adapt the calibration function in a particularly precise manner even when the position sensor is arranged with respect to the magnetic field transducer in such a manner that the periodic measurement signal has a particularly asymmetrical shape. On account of the particularly accurate calibration function, the disclosed apparatus allows the position information to be determined precisely even in the case of an inaccurate geometry of a sensor arrangement. As a result, the position information can be determined accurately using a simple or cost-effective sensor arrangement. As a result of the fact that the Fourier coefficients are determined on the basis of a multiplicity of measurement signal values of the periodic measurement signal and as a result of the fact that the processing unit is designed to at least approximately solve the assigned calibration function for the respective measurement signal value, the calibration function can be newly determined during operation, on the one hand, and the position information can be determined, on the other hand, on the basis of the measurement signal value of the periodic measurement signal and using the calibration function, even a newly determined calibration function. This makes it possible to permanently precisely determine the position information even when an arrangement of the position sensor with respect to the magnetic field transducer changes over time. In addition, a particular robustness of the position sensor with respect to stray fields can thus be achieved.

Examples of the present disclosure provide a method for determining an item of position information relating to a position of a magnetic field transducer relative to a position sensor, wherein the position sensor is designed to generate at least one periodic measurement signal when the magnetic field transducer moves relative to the position sensor. The method comprises determining the position information on the basis of a respective measurement signal value of a respective periodic measurement signal using a calibration function assigned to the respective periodic measurement signal, wherein the assigned calibration function represents the respective periodic measurement signal using a Fourier series having a respective plurality of Fourier coefficients which differ from zero and are of an order greater than zero. The determination of the position information comprises at least approximately solving the assigned calibration function for the respective measurement signal value. The method also comprises determining the Fourier coefficients on the basis of a respective multiplicity of measurement signal values of the respective periodic measurement signal.

Examples of the present disclosure provide a position sensor, wherein the position sensor has a measurement unit which is designed to generate at least one periodic measurement signal when a magnetic field transducer moves relative to the position sensor, and wherein the position sensor has the apparatus described herein for determining an item of position information in order to determine the position information on the basis of the at least one periodic measurement signal.

Examples of the present disclosure provide a computer program having a program code for carrying out the method described herein when the program runs on a computer.

BRIEF DESCRIPTION OF THE DRAWINGS

Examples of the present disclosure are described below with reference to the accompanying drawings, in which:

FIG. 1 shows a schematic illustration of an example of an apparatus for determining an item of position information.

DETAILED DESCRIPTION

Examples of the present disclosure are described in detail below using the accompanying drawings. It should be pointed out that identical elements or elements having the same functionality can be provided with identical or similar reference signs, wherein a repeated description of elements which are provided with the same or a similar reference sign is typically omitted. Descriptions of elements having the same or similar reference signs can be interchanged with one another. Many details are described in the following description in order to provide a more detailed explanation of examples of the disclosure. However, it is obvious to experts that other examples can be implemented without these specific details. Features of the different examples described can be combined with one another unless features of a corresponding combination exclude one another or such a combination is expressly excluded.

Figure 2A:
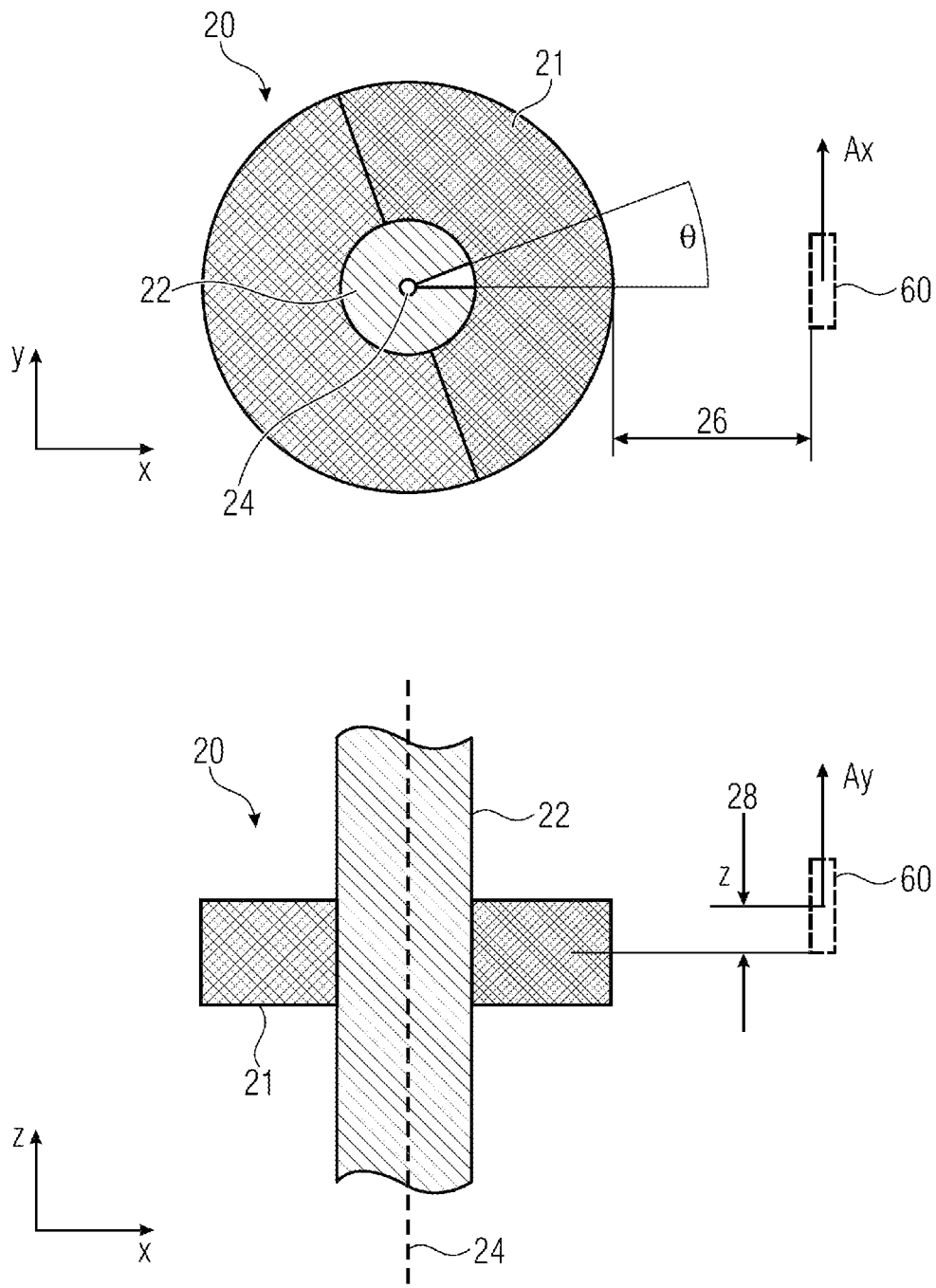
FIG. 2A shows a schematic illustration of an example of an arrangement of a magnetic field transducer and a position sensor.

In examples, the position information relates to a rotational angle θ of a magnetic field transducer 20 which has, for example, a magnetic ring 21 arranged on a mounted shaft 22, for example a diametrically polarized magnetic ring. An example of such an arrangement is illustrated in FIG. 2A. The magnetic ring 21 has a pole pair, wherein opposite poles in the pole pair are arranged alternately in the radial direction with respect to the magnetic ring 21. A position sensor 60 arranged beside the magnetic field transducer 20 is designed to capture a magnetic field generated by the magnetic field transducer 20 using a measurement unit, for example a magnetic field sensor, for example an xMR sensor or a Hall sensor mentioned at the outset. In FIG. 2A, the axis of rotation 24 is arranged along the z direction of a Cartesian coordinate system. The position sensor 60 can be designed to generate different measurement signals on the basis of different spatial components of the magnetic field.

In examples, the position sensor 60 is designed to generate a first measurement signal on the basis of a magnetic field component Ax in the x direction and to generate a second measurement signal on the basis of a magnetic field component Ay in the y direction.

Further examples of the disclosure use an individual measurement signal or a plurality of different measurement signals.

Figure 3:
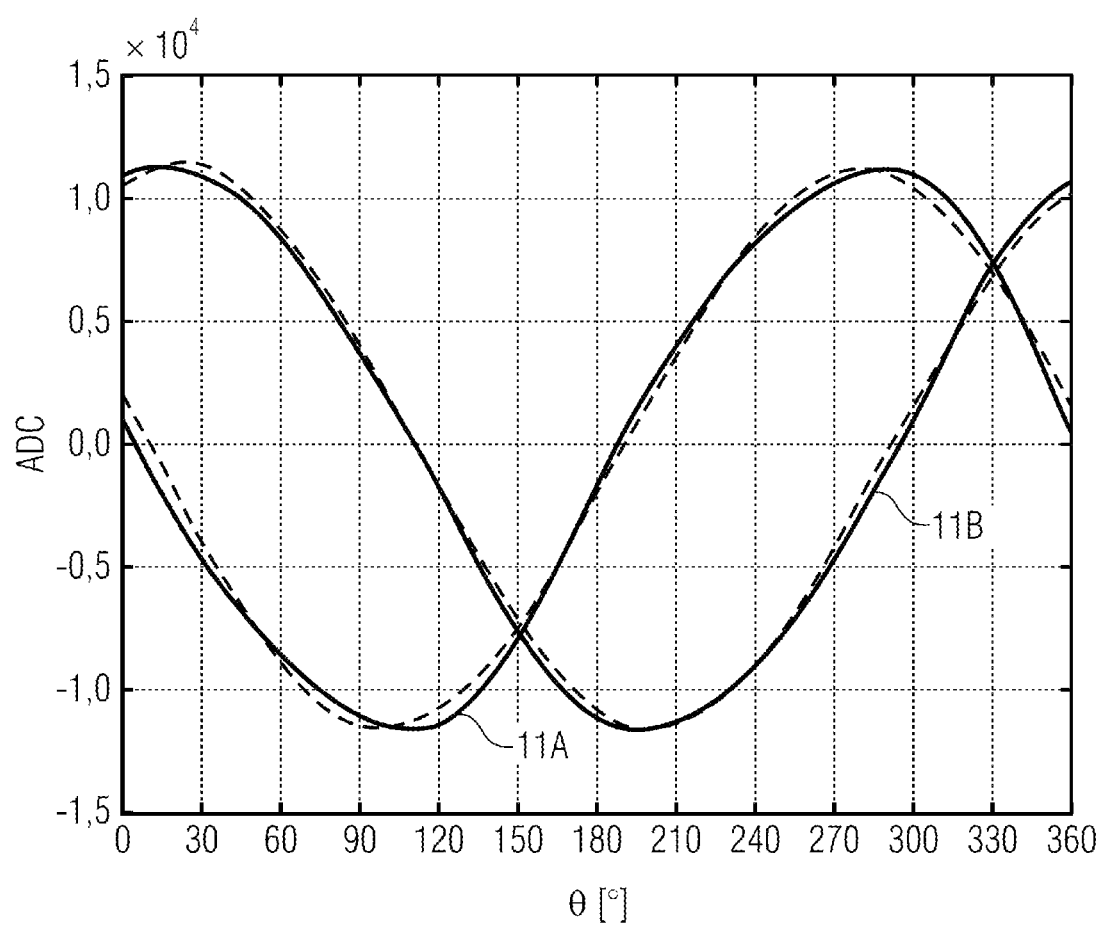
FIG. 3 shows a graph having an example of two periodic measurement signals.

In examples, the magnetic field transducer 20 generates a periodically fluctuating magnetic field in the event of a rotation of the magnetic field transducer 20 around an axis of rotation 24 at the position of the position sensor 60, on the basis of which the position sensor 60 generates the at least one periodic measurement signal. Examples of a first periodic measurement signal 11A and a second periodic measurement signal 11B are shown in FIG. 3. The periodic measurement signals are provided, for example, as an analog signal or as a digital signal, for example as ADC values (ADC=analog digital converter). In order to be able to infer a rotational angle θ, for example the position information, from a measurement signal value of a periodic measurement signal 11A; 11B provided by the position sensor 60, a calibration function which is specific to the periodic measurement signal and represents the signal profile of the periodic measurement signal is used. The more accurately the calibration function reflects the periodic measurement signal, the more accurately the rotational angle can be determined on the basis of a measurement signal value.

In examples, a periodic measurement signal may have a sinusoidal profile with respect to the rotational angle θ. In this case, a calibration function of a measurement signal can be described or implemented using a sine function. Such ideal sinusoidal signal profiles are shown in FIG. 3 as dashed lines. In reality, the periodic measurement signals 11A; 11B, as shown in FIG. 3, may deviate from the ideal sinusoidal signal profile, for example on account of mechanical inaccuracies or magnetic interference fields which can result in an asymmetrical signal profile, for example.

In examples, the position sensor 60 is arranged beside the magnetic ring 21 in the radial direction, with the result that an air gap of the thickness 26 exists between the position sensor 60 and the magnetic ring 21. For example, the position sensor 60 is ideally arranged in a centered manner in the axial direction (z direction in FIG. 2A) with respect to the magnetic ring 21, but the position sensor 60 may also be shifted by a z offset 28 with respect to the centered arrangement. Furthermore, the position sensor 60 may also have an offset in the y direction with respect to a central position with respect to the axis of rotation 24.

Figure 4A:
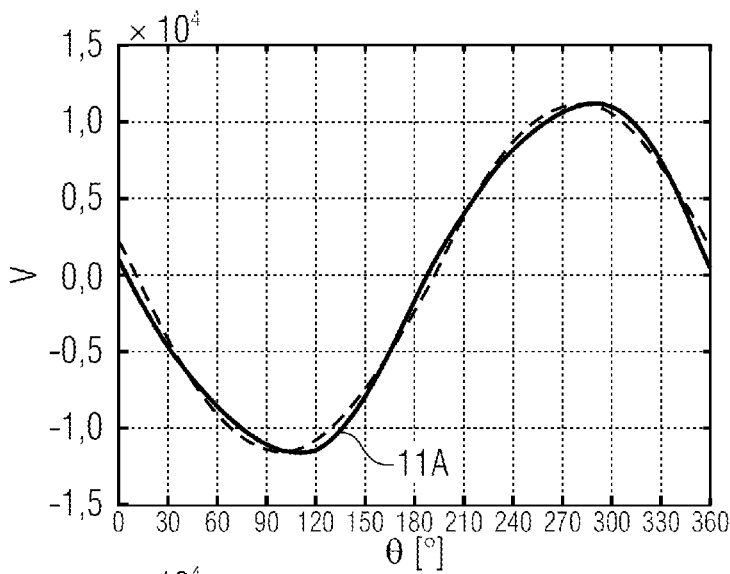
FIGS. 4A-C show graphs having an example of a periodic measurement signal and one example of a Fourier series each.
Figure 4B:
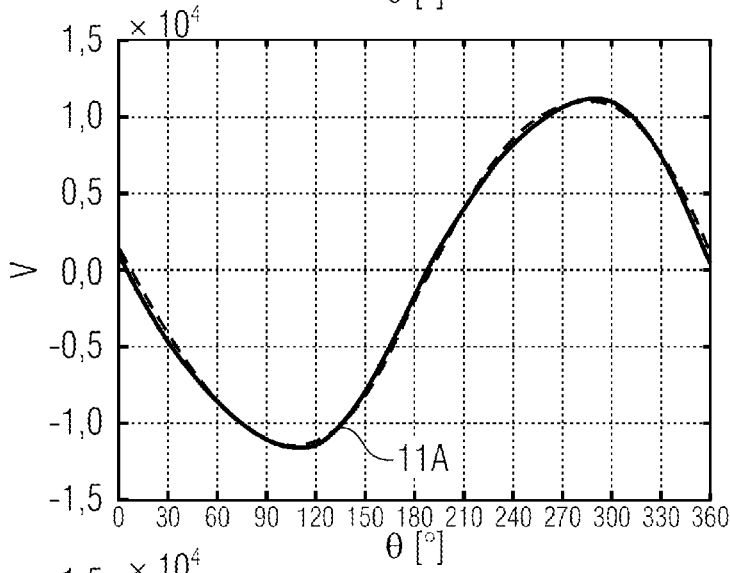
Figure 4C:
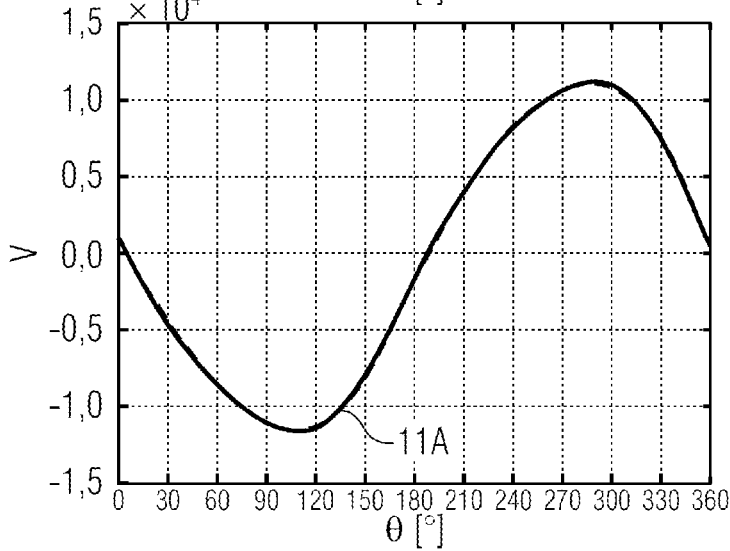

So that the calibration function represents the periodic measurement signal as accurately as possible in the case of deviations of the periodic measurement signal from a sinusoidal profile, the calibration function is represented using a Fourier series according to the disclosure. FIGS. 4A-C show graphs which correspond to the graph shown in FIG. 3 and have examples of the first periodic measurement signal 11A and of a representation of a Fourier series shown as a dashed line. In FIG. 4A, the Fourier series has a first-order Fourier coefficient $c_1$ which differs from zero. In FIGS. 4B and 4C, the Fourier series has the first-order and third-order Fourier coefficients $c_1$ and $c_3$ and first-order, second-order and third-order Fourier coefficients $c_1$, $c_2$ and $c_3$ which differ from zero. As a result of the fact that the calibration function represents the periodic measurement signal using a Fourier series having a plurality of Fourier coefficients which differ from zero and are of an order greater than zero, the calibration function can approximate the periodic measurement signal particularly well, as a result of which particularly accurate calibration can be achieved.

Solving the calibration function makes it possible to determine the position information, for example the rotational angle θ, on the basis of a measurement signal value. The calibration function is approximately solved, for example, by evaluating the calibration function for an estimated value of the rotational angle, wherein the estimated value is varied until a result of the evaluation of the calibration function is within an error tolerance around the measured measurement signal value. On account of the periodicity of the calibration function, this method can result in at least two different solutions of the calibration function. Using a previous item of position information, for example the last known previously determined angle, as the starting value for iteratively solving the calibration function makes it possible to ensure, assuming a small change in the position information, that the solving operation leads to the correct solution of the different solutions of the calibration function, that is to say the iteratively adapted estimated value is at least in the vicinity of the actual value. On account of this type of solution using the previous position information, the disclosed method also functions with only one periodic measurement signal in contrast to determining the rotational angle using an arc tangent function.

The accuracy of the adapted estimated value may be lower in the region of minima and maxima of the calibration function than in regions in which the calibration function has a greater gradient. In order to determine the position information as accurately as possible, a weighted mean value of a plurality of estimated values can therefore be determined. In examples, the first periodic measurement signal and the second periodic measurement signal are phase-shifted through 90°, with the result that the gradient of the first calibration function is greatest at the positions at which the gradient of the second calibration function disappears. Accordingly, a contribution of a respective estimated value can be weighted according to the gradient of the respective calibration function at the position determined by the respective estimated value in order to determine the position information in a very accurate manner.

FIG. 1 shows a schematic illustration of an example of an apparatus 10 for determining an item of position information 19 relating to a position of a magnetic field transducer 20 relative to a position sensor 60, wherein the position sensor 60 is designed to generate at least one periodic measurement signal when the magnetic field transducer 20 moves relative to the position sensor 60. The magnetic field transducer 20 and the position sensor 60 are illustrated using dashed lines in FIG. 1 since they are not part of the apparatus 10 in examples. In particular, the arrangement of the magnetic field transducer 20 and of the position sensor 60 relative to the apparatus 10 should be understood by way of example. For example, the apparatus 10 and the position sensor 60 may be part of the respective other or may each independent apparatuses. The apparatus 10 has a processing unit 15. The processing unit 15 is communicatively connected to the position sensor 60, for example using an electrical conductor or wirelessly, in order to receive the at least one periodic measurement signal from the position sensor 60. The processing unit 15 is designed to determine the position information 19 on the basis of a respective measurement signal value of a respective periodic measurement signal using a calibration function assigned to the respective periodic measurement signal. The assigned calibration function represents the respective periodic measurement signal using a Fourier serious having a respective plurality of Fourier coefficients which differ from zero and are of an order greater than zero, wherein the Fourier coefficients are determined on the basis of a respective multiplicity of measurement signal values of the respective periodic measurement signal. For example, an assigned calibration function respectively represents a periodic measurement signal, wherein the Fourier coefficients are determined specifically for one calibration function in each case. Furthermore, the processing unit 15 is designed to at least approximately solve the assigned calibration function for the respective measurement signal value in order to determine the position information 19. That is to say, the position sensor 60 is designed to generate a first periodic measurement signal 11A when the magnetic field transducer 20 moves relative to the position sensor 60, and the processing unit 15 is designed to determine the position information 19 on the basis of a first measurement signal value, which represents a value of the first periodic measurement signal 11A, using a first calibration function 13A assigned to the first periodic measurement signal 11A. In this case, the first assigned calibration function 13A represents the first periodic measurement signal 11A using a Fourier series having a first plurality of Fourier coefficients which differ from zero and are of an order greater than zero, wherein the Fourier coefficients are determined on the basis of a first multiplicity of measurement signal values of the first periodic measurement signal 11A. In this case, the processing unit 15 is designed to at least approximately solve the assigned calibration function for the first measurement signal value in order to determine the position information 19. The option also exists of the position sensor 60 being designed to generate a further periodic measurement signal 11B when the magnetic field transducer 20 moves relative to the position sensor 60. In examples, the processing unit 15 is designed to accordingly determine the position information 19 on the basis of a further measurement signal value, which represents a value of the further measurement signal, using a further calibration function assigned to the further periodic measurement signal.

In examples, the at least one periodic measurement signal comprises a first periodic measurement signal 11A and a second periodic measurement signal 11B, wherein the first periodic measurement signal 11A and the second periodic measurement signal 11B have a standard period length, and wherein a phase of the second periodic measurement signal 11B is shifted with respect to a phase of the first periodic measurement signal 11A. This makes it possible to assign a combination of a measurement signal value of the first periodic measurement signal 11A and a measurement signal value of the second periodic measurement signal 11B to an unambiguous angular position of the magnetic ring 21 or of the shaft 22, for example. In examples, the first periodic measurement signal 11A and the second periodic measurement signal 11B are each based on a magnetic field component which is perpendicular to the respective other magnetic field component. As a result, the first periodic measurement signal and the second periodic measurement signal may be phase-shifted through 90° with respect to one another. The angular position can therefore be determined using an arc tangent function, for example. In the design of the magnetic ring as a diametrically polarized magnetic ring with a pole pair, as shown in FIG. 2A, this way of determining the angular position may be unambiguous.

In examples, determination of an item of position information or of a rotational angle using an arc tangent function may be implemented using an atan2 function.

Figure 2B:
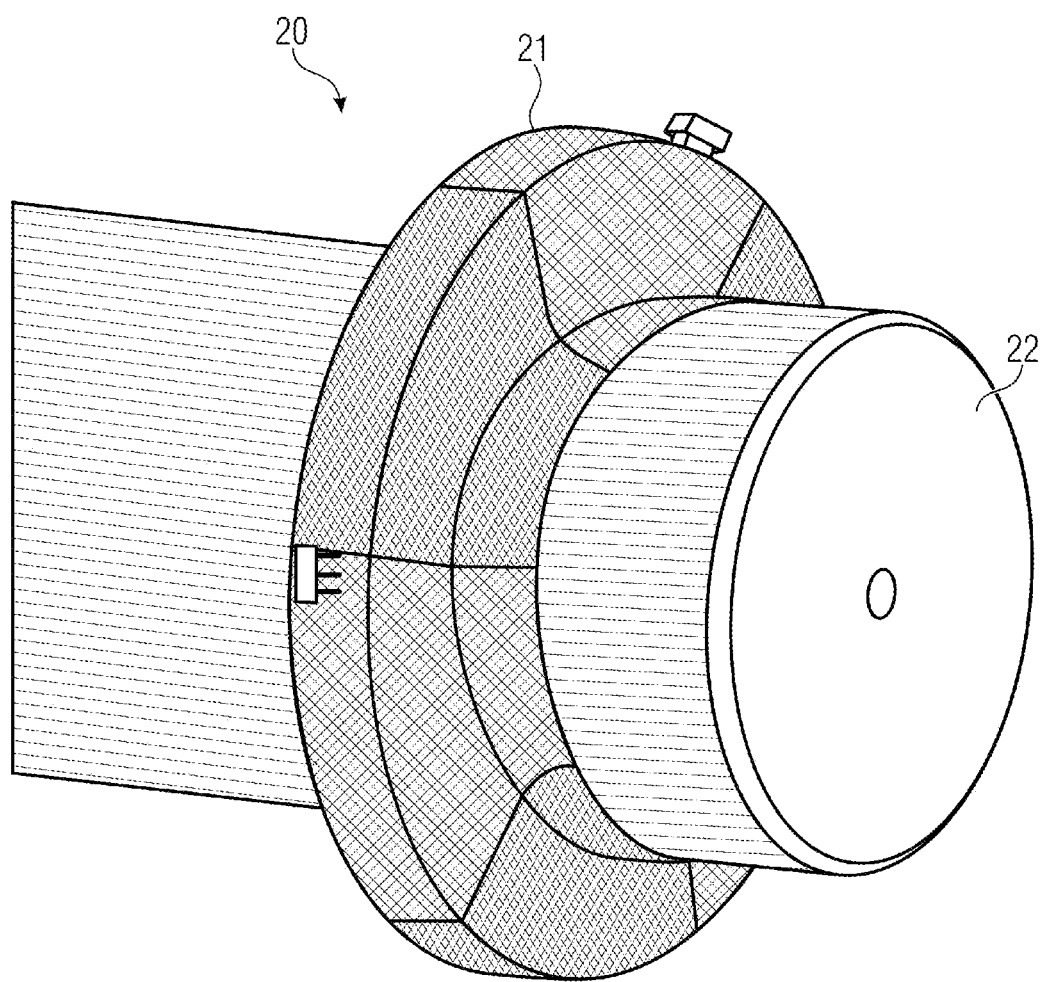
FIG. 2B shows a schematic illustration of an example of a magnetic field transducer.

Like in the example schematically illustrated in FIG. 2B, the magnetic ring 21 may also have a plurality of pole pairs, for example three pole pairs. A number of periods of the at least one periodic measurement signal 11A; 11B, which are generated by the position sensor 60 during a complete revolution of the magnetic field transducer 20, may be proportional to a number of the pole pairs, for example. A higher number of pole pairs may be advantageous for a degree of accuracy with which the position information 19 is determined.

In examples, the processing unit 15 is designed to use a previous item of position information to determine the position information 19 using the respective assigned calibration function. The previous position information may be, for example, the last item of position information which is known to the processing unit 15 and relates to the position of the magnetic field transducer relative to the position sensor and was determined at a previous time. For example, the processing unit 15 may be designed to select that solution from a plurality of possible solutions of the calibration function which is closest to the previous position information as the position information 19 or as the estimated value for the position information 19. On account of the use of the previous position information, the processing unit 15 may be able to unambiguously determine the position information 19 on the basis of an individual measurement signal of the at least one periodic measurement signal.

In examples, the processing unit 15 is designed to use the position information determined last as the previous position information after the apparatus 10 has been switched on. The position information determined last may have been determined, for example, at an earlier time using a calibration function, for example in the period since switch-on. On account of the use of the position information determined last as the previous position information, the assumption that a difference between the current position and the position at the time of determining the previous position is small can apply with a high degree of probability, as a result of which a correct selection of the position information 19 can be ensured.

In examples, the processing unit 15 is designed to determine the previous position information on the basis of a first measurement signal value of the first periodic measurement signal 11A and on the basis of a second measurement signal value of the second periodic measurement signal 11B using an arc tangent function when the apparatus is switched on. Alternatively, the processing unit 15 can also be designed to determine the previous position information on the basis of a first measurement signal value of the first periodic measurement signal 11A and on the basis of a second measurement signal value of the second periodic measurement signal 11B using another combination of the first measurement signal value and the second measurement signal value which is based on trigonometric relationships when the apparatus is switched on. During switch-on, no calibration function determined at an earlier time using one of the assigned calibration functions is available, for example, or this earlier position information is inaccurate, for example because the position changed while the apparatus 10 was switched off. Determination of the previous position information using the arc tangent function or using the other combination of the first measurement signal value and of the second measurement signal value may then be a good approximation for the previous position information and can therefore be used as a good starting value for iteratively adapting an estimated value for the position information.

In examples, the apparatus 10 has a calibration unit 14, wherein the calibration unit 14 is designed to determine the Fourier coefficients of the respective assigned calibration function on the basis of the respective multiplicity of measurement signal values of the respective periodic measurement signals. The respective multiplicity of measurement signal values may comprise, for example, measurement signal values from one or more periods of the respective periodic measurement signal. Since the apparatus 10 has the calibration unit 14, the apparatus 10 may be able to independently newly determine the respective calibration function, for example without being dependent on a calculation or determination by an external calibration unit 14.

In examples, the Fourier series has the form $$\tilde{X}[n] = \sum_{k=0}^{N-1} c_k * e^{j\frac{2\pi}{N}kn}; c_k = \frac{1}{N}\sum_{n=0}^{N-1} \tilde{x}[n] * e^{-j\frac{2\pi}{N}kn}, \quad (1)$$

wherein $\tilde{X}$ represents, for example, a measurement signal value of a periodic measurement signal, n represents a phase of the periodic measurement signal which is intended to be assigned to the rotational angle θ for example, and $c_k$ represents, for example, a k-th order Fourier coefficient. A summand of the zeroth order (for example for k=0) of the Fourier series may represent, for example, a constant term, that is to say a term independent of the phase. A summand of the k-th order, with k>0, can then represent a term which, in examples, can be represented in a simplified manner as a sine or cosine function of k times the phase.

In examples, the first assigned calibration function can represent the first periodic measurement signal using a Fourier series of Fourier coefficients $c_{x1}, c_{x2}, c_{x3}$ which differ from zero, and can be expressed in a simplified manner, for example, as:

$$X = c_{x1}*\cos(\theta+\varphi_{x1}) + c_{x2}*\cos(2*\theta+\varphi_{x2}) + c_{x3}*\cos(3*\theta+\varphi_{x3}) + O_x \quad (2)$$

In this example, X denotes a value of the first assigned calibration function at the position θ. $O_X$ may be an offset or a constant offset for the value of the calibration function. $\varphi_{x1}, \varphi_{x2}, \varphi_{x3}$ may each be a phase offset for the respective summands of the calibration function and may be constants which are determined together with the Fourier coefficients during calibration, for example.

For example, the second assigned calibration function can accordingly represent the second periodic measurement signal using a Fourier series of Fourier coefficients $c_{y1}, c_{y2}, c_{y3}$ which differ from zero, and can be expressed in a simplified manner, for example, as:

$$Y = c_{y1}*\sin(\theta+\varphi_{y1}) + c_{y2}*\sin(2*\theta+\varphi_{y2}) + c_{y3}*\sin(3*\theta+\varphi_{y3}) + O_y \quad (3)$$

In this case, Y can denote the value of the second assigned calibration function.

In examples, the calibration unit 14 is designed to determine the Fourier coefficients of the respective assigned calibration function using a discrete Fourier analysis or a DFT analysis (DFT=Discrete Fourier Transformation). A Fourier analysis is a very efficient and fast method for determining the Fourier coefficients.

In examples, the calibration unit 14 is designed to also determine the Fourier coefficients of the respective assigned calibration function on the basis of a multiplicity of reference position values, wherein a reference position value is respectively assigned to a measurement signal value of the multiplicity of measurement signal values of one or more of the at least one periodic measurement signal. For example, the calibration unit is designed to assign a respective measurement signal value of the respective multiplicity of measurement signal values to a reference position value in order to obtain a multiplicity of value pairs assigned to the respective periodic measurement signal and to determine the respective assigned calibration function on the basis of the respective multiplicity of value pairs. The calibration function can be determined in a particularly accurate manner with the aid of the reference position values.

In examples, the calibration unit 14 is designed to determine the multiplicity of reference position values on the basis of an item of information relating to a speed of the relative movement and on the basis of an evaluation of a period length of the at least one periodic measurement signal. For example, the calibration unit 14 may be designed to assign a reference position value to a measurement signal value of the respective multiplicity of measurement signal values assuming a constant speed of the relative movement and assuming that the individual measurement signal values of the respective multiplicity of measurement signal values are recorded at equal intervals. For example, the calibration unit 14 may be designed to determine the multiplicity of reference position values independently or itself in order and to carry out a self-calibration on the basis thereof. As a result, the apparatus may be able to determine the respective assigned calibration function independently, that is to say without an additional apparatus for example, even during operation. The apparatus may therefore ensure permanently precise determination of the position information.

In examples, the calibration unit 14 is designed to determine the multiplicity of reference position values using an item of reference position information provided by a decoder, for example a position decoder or a decoder of a stepping motor, wherein the decoder is designed to determine the reference position information on the basis of the relative movement. For example, the apparatus 10 may be designed to receive the multiplicity of reference values from the decoder. Reference position values provided by a decoder can be particularly accurate and can therefore make it possible to precisely determine the calibration function.

In examples, the respective assigned calibration function comprises the Fourier series in a representation simplified using trigonometric methods. The simplified representation of the Fourier series makes it possible, for example, to reduce a number of function calls used to calculate the respective value of the respective assigned calibration functions at the position of the respective estimated value, with the result that this calculation can be carried out in a particularly efficient manner.

For example, the examples of the calibration functions X and Y (equations (2) and (3)) shown above can be simplified or optimized using the equations $$\sin(A+B) = \sin(A)*\cos(B) + \cos(A)*\sin(B)$$

$$\cos(A+B) = \cos(A)*\sin(B) - \sin(A)*\cos(B)$$

$$\sin(2x) = 2*\sin(x)*\cos(x)$$

$$\cos(2x) = \cos^2 x - \sin^2 x$$

A range of calculations, for example codec calculations, for example a number of function calls, can therefore be reduced.

In examples, the processing unit 15 is designed to iteratively adapt a respective estimated value, for example an estimated value for the position information, for example a rotational angle θ, on the basis of the previous position information in order to reduce a distance between the respective measurement signal value and a respective value of the respective assigned calibration functions at the position of the respective estimated value and to determine the position information 19 on the basis of the respective estimated value. For example, the processing unit 15 is designed to iteratively adapt a first estimated value on the basis of the previous position information in order to reduce a distance between the first measurement signal value and a value of the first assigned calibration functions at the position of the first estimated value and to determine the position information 19 on the basis of the first estimated value. In addition, the processing unit 15 may be designed to accordingly determine the position information on the basis of a further estimated value using the further calibration function. For example, the distance between the respective measurement signal value and the respective value of the respective assigned calibration functions at the position of the respective estimated value is iteratively reduced until it undershoots a maximum deviation. Suitably choosing the maximum deviation makes it possible, for example, to set a compromise between a speed or a computing complexity of the adaptation and an accuracy of the result in an application-specific manner. Since the respective estimated value is adapted on the basis of the previous position information, a number of iteration steps is kept low. As a result, it is possible to determine the position information 19 quickly and with little computing complexity and it can also be ensured that a periodic measurement signal alone also results in correct determination of the position information 19 with a high degree of probability. Iterative adaptation of the respective estimated value makes it possible to efficiently solve the respective assigned calibration function.

In examples, the processing unit 15 is designed to adapt the respective estimated value according to the Newton method or another approximation method. The Newton method can be used in a particularly efficient manner to minimize the distance between the respective measurement signal value and the respective value of the respective assigned calibration functions at the position of the respective estimated value. This makes it possible to determine the position information 19 quickly and with little computing complexity.

In examples, the processing unit 15 is designed to iteratively adapt a first estimated value and a second estimated value on the basis of the previous position information 19 in order to reduce a distance between the respective measurement signal value and a respective value of the respective assigned calibration functions for the respective estimated value and to weight the first estimated value and the second estimated value for determining the position information 19. For example, the processing unit 15 is designed to calculate a weighted average of the first estimated value and of the second estimated value in order to determine the position information 19. Weighting the first and second estimated values results in a combination of the first periodic measurement signal and the second periodic measurement signal for determining the position information 19, as a result of which it is possible to compensate for any possible inaccuracy of the first assigned calibration function and of the second assigned calibration function. The first estimated value and the second estimated value are combined in a particularly favorable manner by the weighting. For example, the processing unit 15 is designed to give a more inaccurate estimated value a lower weighting than a more accurate estimated value, as a result of which the position information 19 can be determined in a very accurate manner. The weighting of the first estimated value and of the second estimated value is particularly effective if the first periodic measurement signal and the second periodic measurement signal are phase-shifted through approximately 90° with respect to one another since, in this case, one estimated value is particularly accurate at precisely those positions at which the respective other estimated value is particularly inaccurate.

In examples, the processing unit 15 is designed to weight the first estimated value and the second estimated value on the basis of a respective gradient of the respective assigned calibration function at the position of the respective estimated value, wherein the respective weighting is greater, the greater the respective gradient. For example, the processing unit 15 is designed to weight the respective estimated values using a respective weighting function 51A, 51B, wherein the respective weighting function 51A, 51B describes the contributions of the respective estimated values to the position information 19 in a position-dependent manner, and wherein the contributions of the respective estimated value are greater, the greater the respective gradient of the respective calibration function at the corresponding position. Such weighting can ensure that a very high degree of accuracy of the position information 19 is achieved despite a small number of iteration steps when adapting the estimated values.

Figure 5:
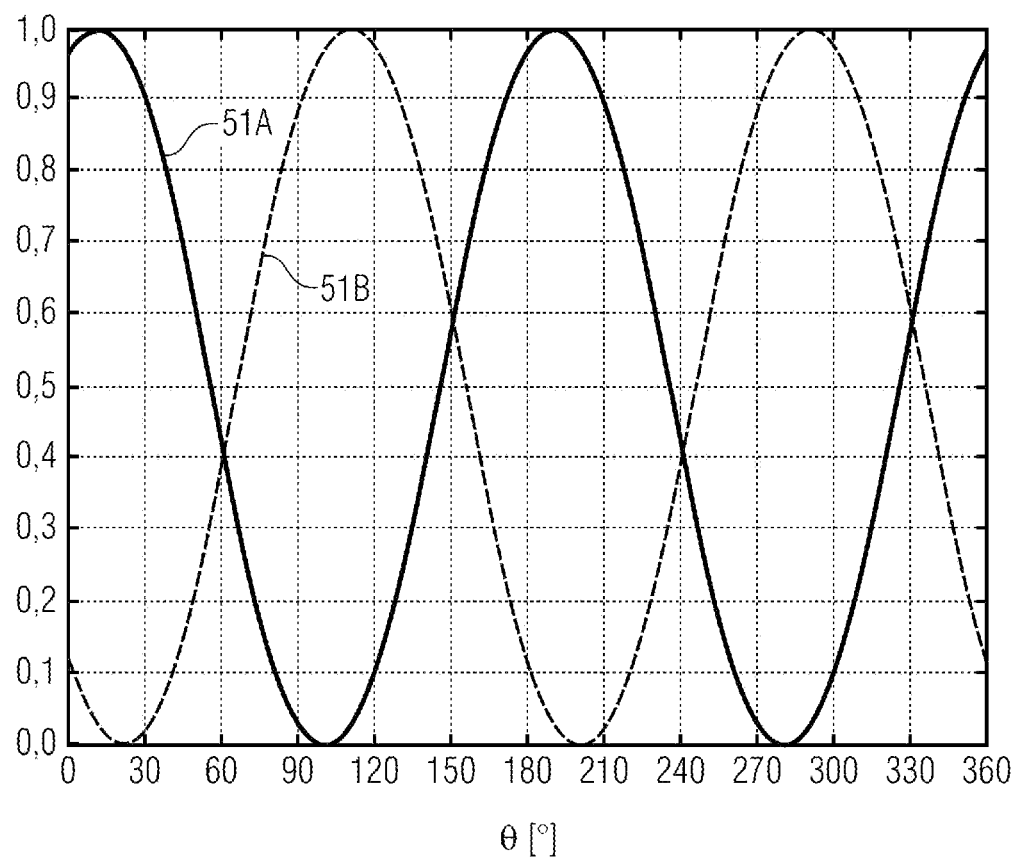
FIG. 5 shows a graph having an example of two weighting functions.

FIG. 5 shows a graph having examples of a first weighting function 51A of the first periodic measurement signal 11A and of a second weighting function 51B of the second periodic measurement signal 11B on the basis of the rotational angle $\theta$. The weighting functions shown in FIG. 5 are suitable, for example, for weighting the examples of periodic measurement signals 11A, 11B shown in FIG. 3.

Examples of this disclosure provide a position sensor 60, wherein the position sensor 60 has a measurement unit which is designed to generate at least one periodic measurement signal when a magnetic field transducer 20 moves relative to the position sensor 60, and wherein the position sensor has an apparatus 10 for determining an item of position information 19 order to determine the position information 19 on the basis of the at least one periodic measurement signal.

In examples, the measurement unit has a magnetic field sensor, for example an xMR sensor or a Hall sensor. As a result of the combination of an xMR sensor with the apparatus 10, the position sensor can be produced efficiently, for example using semiconductor manufacturing processes, and may be able to determine the position information 19 with a high degree of accuracy.

In examples, the position sensor 60 has an integrated circuit, wherein the integrated circuit comprises the measurement unit and the apparatus 10 for determining an item of position information 19. For example, the measurement unit and the apparatus 10 are arranged on a common substrate. As a result of the fact that the integrated circuit comprises both the measurement unit and the apparatus 10, the position sensor can be designed in a particularly space-saving saving manner, can be produced in a particularly simple manner and can be arranged particularly easily in a circuit, for example on a printed circuit board (PCB).

In examples, a first integrated circuit comprises the measurement unit and a second integrated circuit comprises the apparatus 10 for determining an item of position information 19. For example, the second integrated circuit is designed to enable a high computing power of the apparatus 10. As a result of the separate circuits, the measurement unit and the apparatus 10 can be produced, for example, separately, for example using manufacturing processes of different complexity, thus making it possible to save costs.

Figure 7:
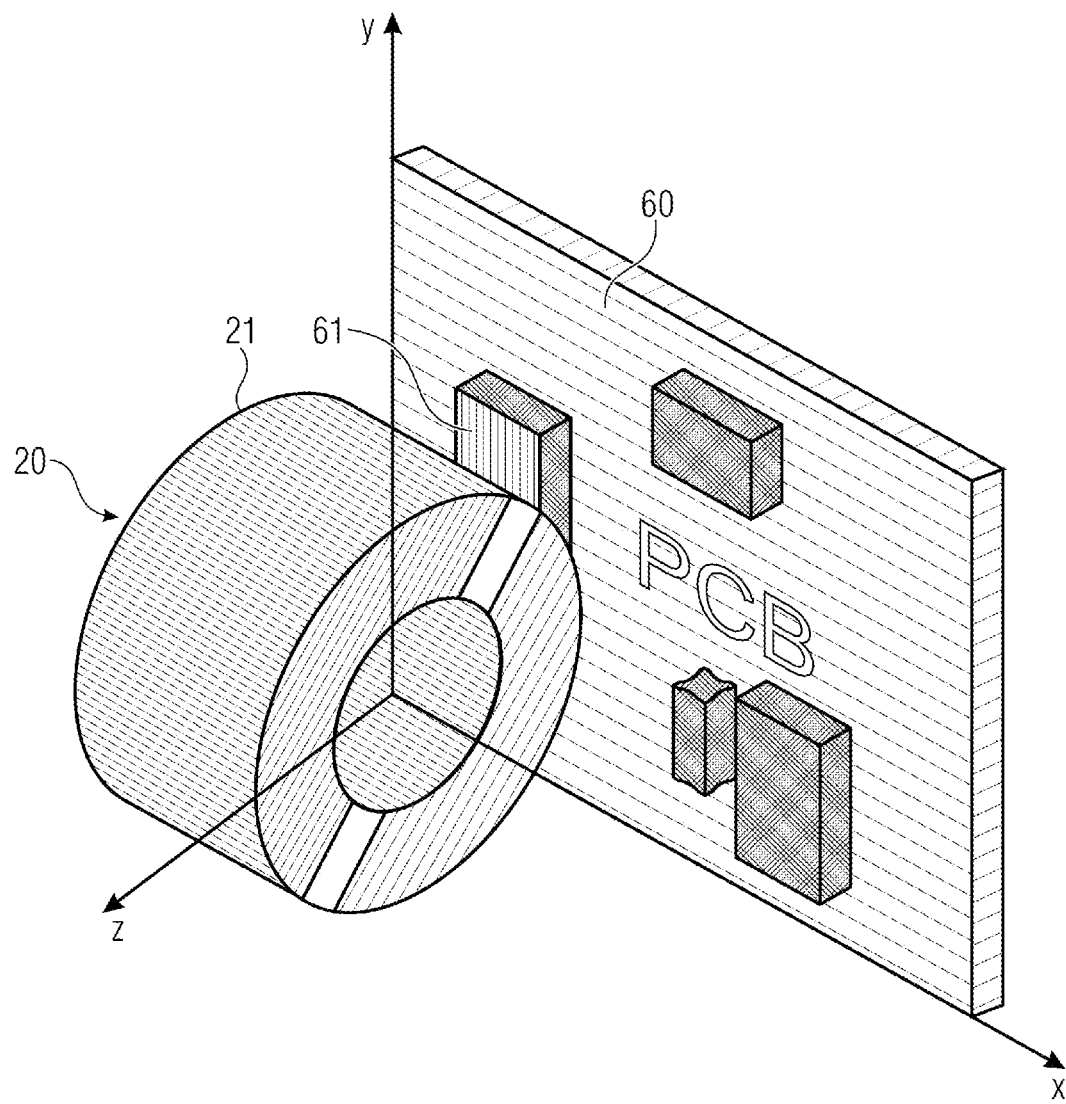
FIG. 7 shows a schematic illustration of an example of an arrangement of a position sensor and a magnetic field transducer.

FIG. 7 shows a schematic illustration of an example of an arrangement of a position sensor 60 and a magnetic field transducer 20, wherein the position sensor 60 has a measurement unit 61.

In examples, the magnetic field transducer 20 has a magnetic ring 21 which is arranged around an axis of rotation and has magnetic poles which alternate in the radial direction, wherein the measurement unit has a magnetic field sensor which is stationary with respect to a rotation of the magnetic ring around the axis of rotation.

Figure 8:
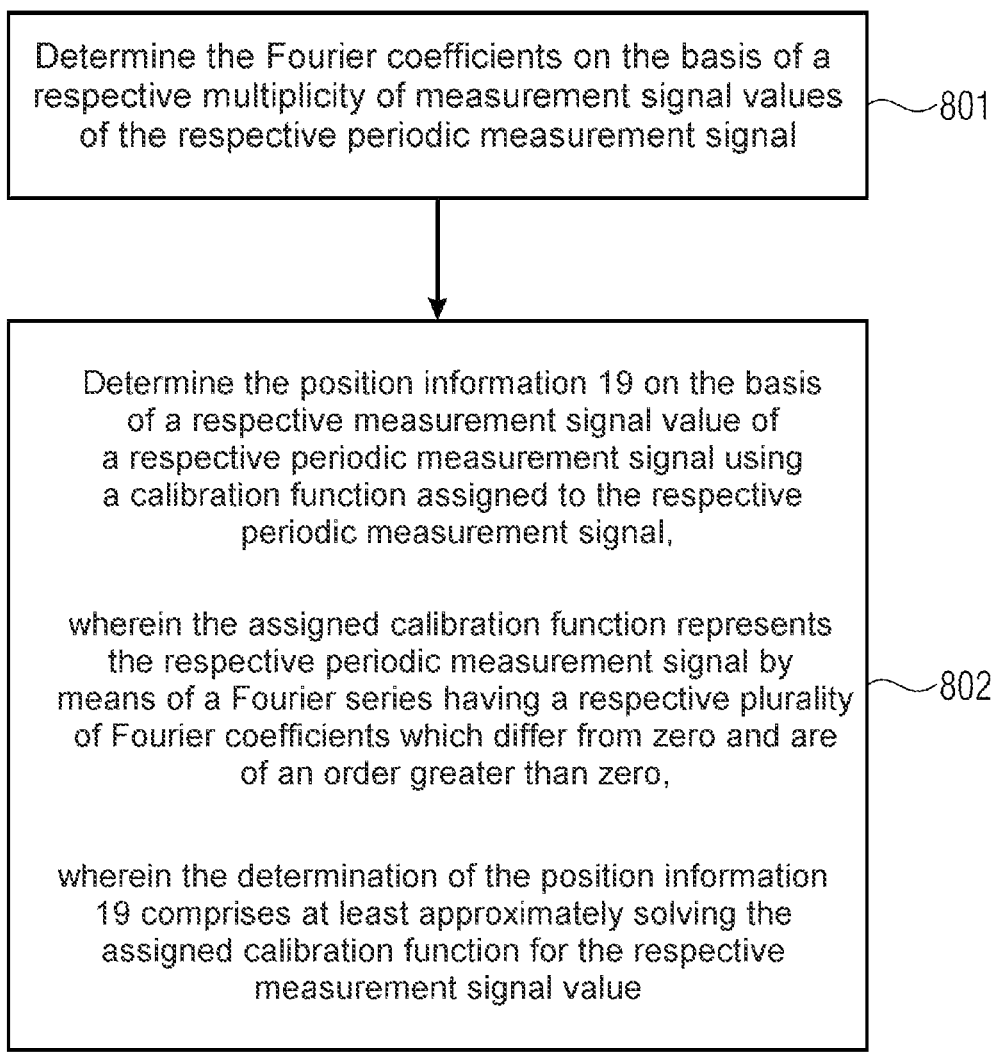
FIG. 8 shows a flowchart of an example of a method for determining an item of position information.

FIG. 8 shows a method 800 for determining an item of position information 19 relating to a position of a magnetic field transducer 20 relative to a position sensor 60, wherein the position sensor 60 is designed to generate at least one periodic measurement signal when the magnetic field transducer 20 moves relative to the position sensor 60. The method 800 comprises determining 810 the Fourier coefficients on the basis of a respective multiplicity of measurement signal values of the respective periodic measurement signal. The method 800 also comprises determining 820 the position information 19 on the basis of a respective measurement signal value of a respective periodic measurement signal using a calibration function assigned to the respective periodic measurement signal, wherein the assigned calibration function represents the respective periodic measurement signal using a Fourier series having a respective plurality of Fourier coefficients which differ from zero and are of an order greater than zero. The determination 820 of the position information 19 comprises at least approximately solving the assigned calibration function for the respective measurement signal value.

The illustrated sequence of method steps should be understood by way of example. The steps can also be carried out in a different order, at the same time or individually. The individual steps can be carried out, in particular, with a different frequency; for example, the determination 820 of the position information 19 can be carried out more often than the determination 810 of the Fourier coefficients.

Figure 9:
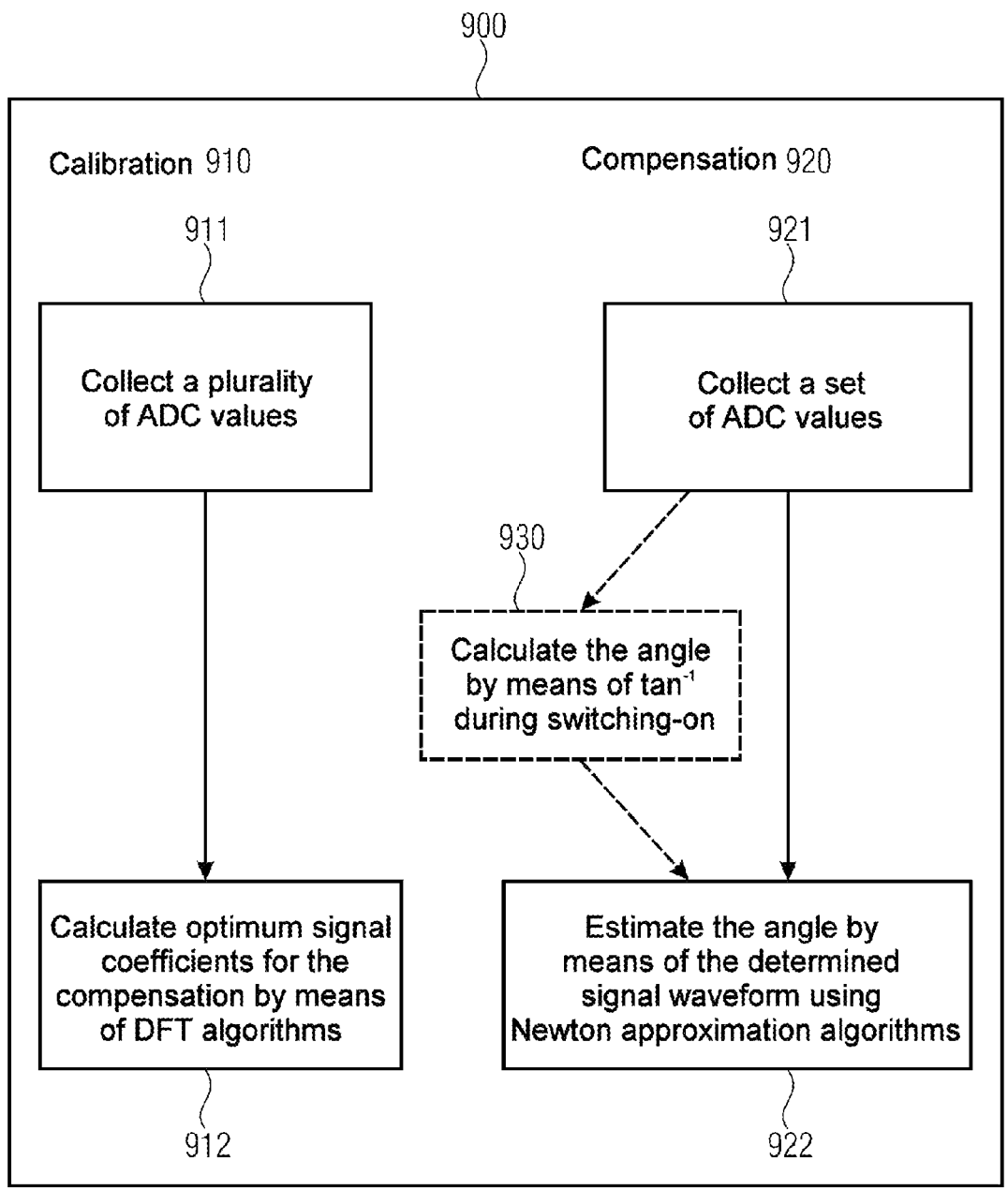
FIG. 9 shows a flowchart of a further example of a method for determining an item of position information.

In examples, this disclosure relates to a method for calibrating and compensating for signals from sensors, for example in "out-of-shaft", "end-of-shaft" or "integrated end-of-shaft" sensor systems. FIG. 9 shows a flowchart of an example of a method 900 for calibrating and compensating for such signals. The method 900 is based on the method 800. The method 900 comprises a calibration 910 which is based on the determination 810 of the Fourier coefficients, for example. The calibration can be carried out once (one-off calibration), normally at the end of the production of a module for determining the position information 19 outside the shaft, or continuously or periodically in use (self-calibration). The calibration 910 comprises collecting 911 a plurality of ADC values, for example recording the multiplicity of measurement signal values of the periodic measurement signal, using an xMR sensor or a sensor based on the Hall effect, for example using the measurement unit 61. The calibration also comprises calculating 912 optimal signal coefficients or estimating parameters, for example the Fourier coefficients, using DFT algorithms. In addition, the correct reference angles should be used for these ADC values. For a one-off calibration, these values can be determined using a dedicated rotary encoder or can be derived from the known angular positions of a stepping motor. For a self-calibration, an equidistant sampling rate and an approximately constant angular velocity can be assumed (this is also possible for a one-off calibration). The validity of these assumptions can be checked by observing the periods of a plurality of revolutions. Finally, the calibration comprises estimating an optimal set of parameters, for example Fourier coefficients and phase shifts. The method 900 also comprises a compensation 920 which is based on the determination 820 of the position information 19, for example. The compensation 920 comprises correcting recorded sensor results or measurement values, for example a measurement signal value, and finally calculating the estimated mechanical angle θ, for example the position information 19. During switching-on, for example the switching-on of the apparatus 10, a first angle, for example the previous position information 19, may be calculated 930 using an arc tangent function or a signal analysis. In contrast to sensor applications at the end of a shaft, the magnetic amplitudes Ax and Ay of the cosine and sine components of the magnetic field, as shown in FIG. 2A, generally differ in sensor applications outside a shaft. The signals are greatly deformed over 360°. Such a deformation can be seen in FIG. 3 where raw signal values from both channels of a GMR sensor with a vertical orientation (air gap 26=1.6 mm, z offset 28=1 mm, offset in the y direction=0.4 mm (directions based on FIG. 2A)) are shown. Ideal cosine and sine functions are additionally shown there as an orientation aid. The raw signal values, for example as shown in FIG. 3, for example the multiplicity of measurement signal values, can be broken down into a Fourier series according to equation (1) and can be written as an extracted and simplified Fourier series for three coefficients according to equations (2) and (3). A DFT analysis of the channels makes it possible to determine $c_{x1}$, $c_{x2}$, $\varphi_{x1}$, $\varphi_{x2}$, $\varphi_{x3}$, $\varphi_{y1}$, $c_{y2}$, $c_{y3}$, $\varphi_{y1}$, $\varphi_{y2}$, $\varphi_{y3}$. For example, $c_1$ shows the greatest influence, followed by $c_3$ and $c_2$. The number of coefficients can be increased or reduced in any desired manner. FIGS. 4A-C show the influence of a different set of coefficients on the curve adaptation (dashed lines) to raw signal values (solid lines). For example, no significant improvement can arise in the case of more than three coefficients and the residual error of the angle may be almost as large as in current solutions in the case of only one coefficient, cf. FIG. 4A. Two or three coefficients are therefore advantageous, for example. New ADC values, for example measurement signal values, are recorded during operation. The mechanical angle, for example the position information 19, is determined by varying an estimated angle θ', for example an estimated value, for example one estimated value for a respective periodic measurement signal or for each channel in each case, for example $\theta_x'$ and $\theta_y'$, in such a manner that the Fourier series, for example the respective assigned calibration function, $$X' = c_{x1}*\cos(\theta_x'+\varphi_{x1})+c_{x2}*\cos(2*\theta_x'+\varphi_{x2})+c_{x3}*\cos(3*\theta_x'+\varphi_{x3})+O_x$$

$$Y' = c_{y1}*\cos(\theta_y'+\varphi_{y1})+c_{y2}*\cos(2*\theta_y'+\varphi_{y2})+c_{y3}*\cos(3*\theta_y'+\varphi_{y3})+O_y$$

for example a value X' or Y' of the respective assigned calibration function, meets the conditions $$\min(|X-X'|), \min(|Y-Y'|),$$

wherein X and Y are, for example, measured ADC values of the two channels, for example respective measurement signal values of the respective periodic measurement signal. On account of a high degree of inaccuracy of the method at positions at which the signal has a minimum or a maximum, the mechanical angle θ' should be calculated using a weighted average of both channels. Examples of weighting functions 51A, 51B for the X channel 11A and the Y channel 11B are shown in FIG. 5. The maximum for a value is at the position at which the signal exhibits the greatest change. The weighting functions 51A, 51B can be described, for example, using the following equation:

$$\theta = \frac{\theta_x'*(1-|\cos(\theta_x'+\varphi_x)|)+\theta_y'*(1-|\sin(\theta_y'+\varphi_y)|)}{(1-|\cos(\theta_x'+\varphi_x)^2|)+(1-|\sin(\theta_y'+\varphi_y)^2|)}$$

That angle θ calculated in this manner can then be used as the starting value, for example as the previous position information 19, for the next ADC value, for example for determining the next item of position information 19.

Figure 6A:
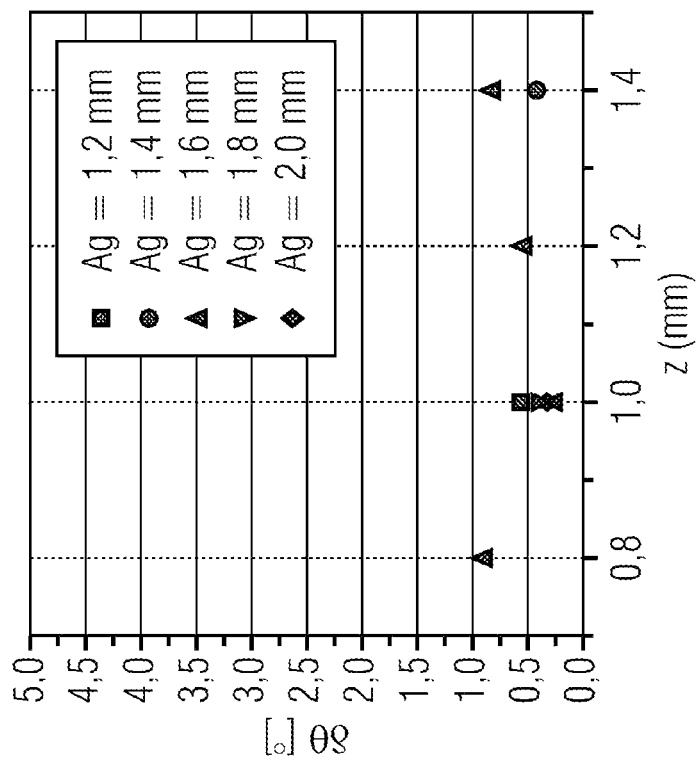
FIG. 6A shows a graph having examples of a maximum error of an item of position information determined using a current solution on the basis of an arrangement of the position sensor.
Figure 6B:
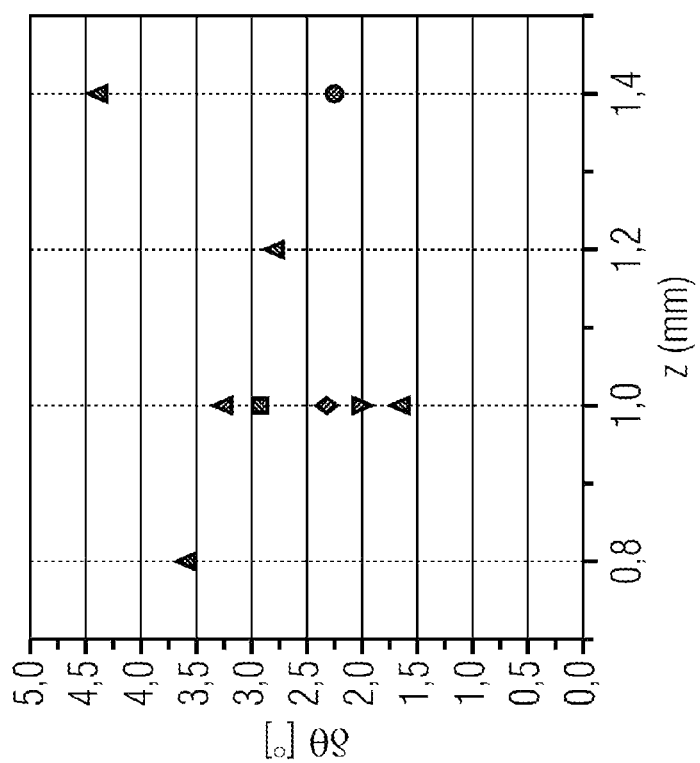
FIG. 6B shows a graph having examples of a maximum error of an item of position information determined using the disclosed apparatus on the basis of an arrangement of the position sensor.
Figure 10A:
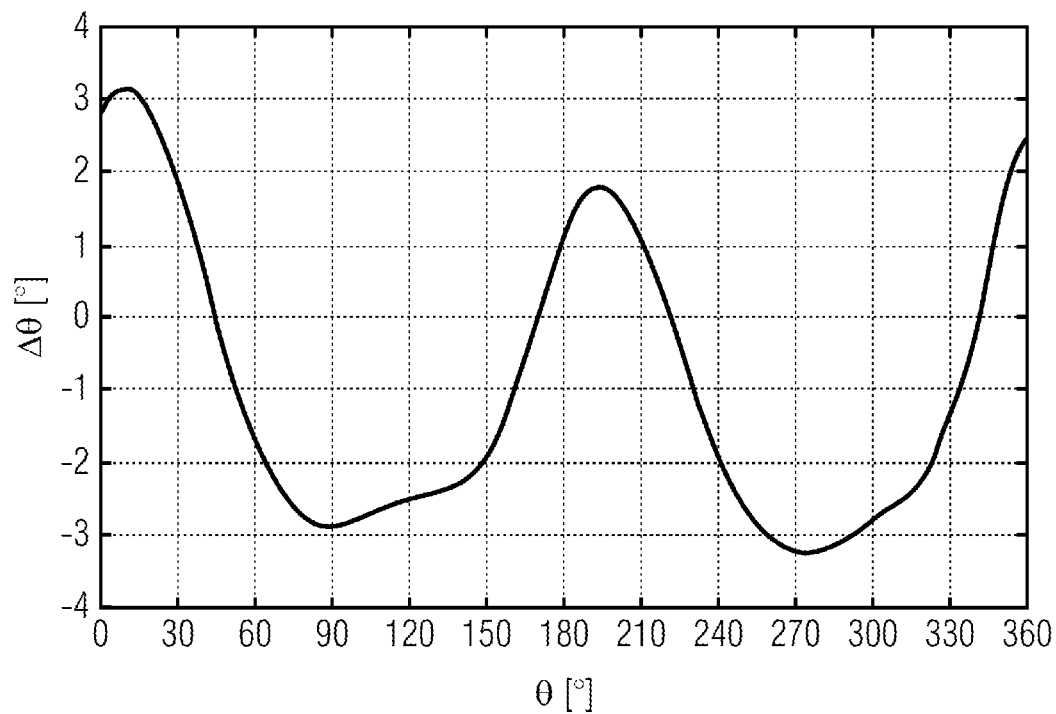
FIG. 10A shows a graph having an example of an error of an item of position information determined using a current solution.
Figure 10B:
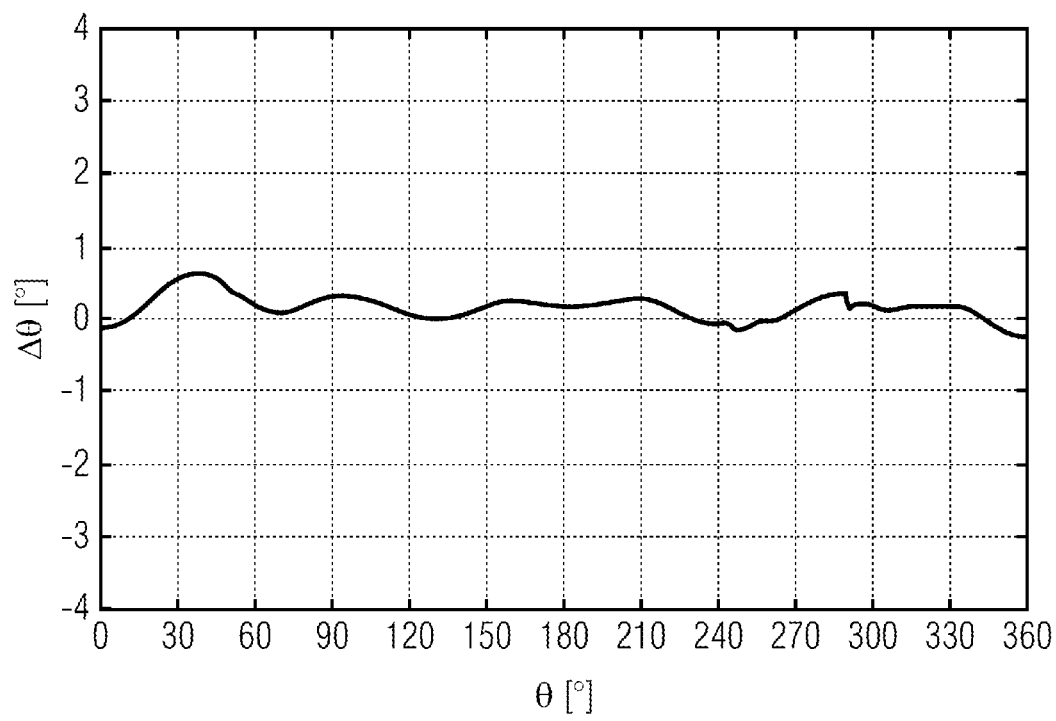
FIG. 10B shows a graph having an example of an error of an item of position information determined using the disclosed apparatus.

FIGS. 10A-B show an example of a comparison of the evaluated angle, for example the determined position information 19, with a reference system, for example a current solution. The residual error Δθ of the rotational angle for a sensor with a vertical orientation (Ag=1.6 mm, z offset 28=1 mm, offset in the y direction=0.4 mm (directions based on FIG. 2A)) for a current compensation (FIG. 10A) and the approximation process or the disclosed compensation 820, 920 (FIG. 10B) is shown. The residual error of the rotational angle can be drastically reduced using the latter method in comparison with current methods. FIGS. 6A and 6B show maximum angle errors 60, for example maximum residual errors of the rotational angle, plotted against the z offset 28 for sensor arrangements of a GMR sensor with different air gaps 26 for current compensation methods, cf. FIG. 6A, and the disclosed method 900, cf. FIG. 6B. FIGS. 6A-B show examples of the effectiveness of differently sized air gaps Ag and distances z between the magnet and the sensor of the disclosed method using three coefficients, for example Fourier coefficients. The maximum error can be reduced, for example, from 4.5° (Ag=1.6 mm, z=1.4 mm) to below 1°, which may be sufficiently good for many applications, and even below 0.5° is possible. With only two coefficients, the angle error may be around 1° and, with only one coefficient, it may be at the level of standard compensation. The disclosed method can significantly reduce the residual error of the determined rotational angle in sensor arrangements outside the shaft and is able to compensate for a mechanical shift during the production process.

In examples, different possibilities can be used to integrate the disclosed apparatus in a sensor component. For example, the apparatus can be implemented with the sensor as one component, for example using integration on a silicon wafer, that is to say the apparatus uses the same technology as the sensor. Alternatively, the disclosed apparatus and the sensor can be implemented in two component parts, with the result that the calculations are carried out in a second component. This makes it possible to produce the sensor using one technology and to produce the component part for calculations using another technology.

In examples, the disclosed method for compensating for or determining an item of position information 19 can be carried out in a sensor or in an external microcontroller, for example a microcontroller separate from the sensor.

In examples, the disclosure relates to a calibration and determination of optimum compensation parameters and algorithms for sensor arrangements outside a shaft. As such, they can be directly used by a user, for example, during or after the production of the sensor module In examples, the position sensor 60 has a Hall sensor and the apparatus 10 is designed to normalize the at least one periodic measurement signal in order to obtain the position information 19 in normalized form on the basis of a respective measurement signal value of a respective periodic measurement signal.

In examples of the present disclosure, the processing circuit can be implemented using any desired suitable circuit structures, for example microprocessor circuits, ASIC circuits, CMOS circuits and the like. In examples, the processing circuit may be implemented as a combination of hardware structures and machine-readable instructions. For example, the processing circuit may have a processor and storage devices which store machine-readable instructions which result in the performance of methods described herein when they are executed by the processor.

Although some aspects of the present disclosure have been described as features in connection with an apparatus, it is clear that such a description can likewise be considered to be a description of corresponding method features. Although some aspects have been described as features in connection with a method, it is clear that such a description can also be considered to be a description of corresponding features of an apparatus or of the functionality of an apparatus.

Some or all of the method steps can be carried out by a hardware apparatus (or using a hardware apparatus), for example a microprocessor, a programmable computer or an electronic circuit. In some example implementations, some or a plurality of the most important method steps can be carried out using such an apparatus.

Depending on particular implementation requirements, example implementations of the disclosure can be implemented in hardware or software or at least partially in hardware or at least partially in software. The implementation can be carried out using a digital storage medium, for example a floppy disk, a DVD, a Blu-ray disc, a CD, a ROM, a PROM, an EPROM, an EEPROM or a flash memory, a hard disk or another magnetic or optical memory which stores electronically readable control signals which interact or can interact with a programmable computer system in such a manner that the respective method is carried out. Therefore, the digital storage medium may be computer-readable.

Some example implementations according to the disclosure therefore comprise a data carrier having electronically readable control signals which are able to interact with a programmable computer system in such a manner that one of the methods described herein is carried out.

Example implementations of the present disclosure can generally be implemented as a computer program product having a program code, wherein the program code is effective to carry out one of the methods when the computer program product runs on a computer.

The program code may be stored on a machine-readable carrier, for example.

Other example implementations comprise the computer program for carrying out one of the methods described herein, wherein the computer program is stored on a machine-readable carrier. In other words, an example implementation of the disclosed method is therefore a computer program having a program code for carrying out one of the methods described herein when the computer program runs on a computer.

A further example implementation of the disclosed methods is therefore a data carrier (or a digital storage medium or a computer-readable medium) on which the computer program for carrying out one of the methods described herein is recorded. The data carrier or the digital storage medium or the computer-readable medium is typically tangible and/or non-volatile.

A further example implementation of the disclosed method is therefore a data stream or a sequence of signals representing the computer program for carrying out one of the methods described herein. The data stream or the sequence of signals may be configured, for example, to be transferred via a data communication connection, for example via the Internet.

A further example implementation comprises a processing device, for example a computer or a programmable logic component, which is configured or adapted to carry out one of the methods described herein.

A further example implementation comprises a computer on which the computer program for carrying out one of the methods described herein is installed.

A further example implementation according to the disclosure comprises an apparatus or a system which is designed to transmit a computer program for carrying out at least one of the methods described herein to a receiver. The transmission can be carried out electronically or optically, for example. The receiver may be, for example, a computer, a mobile device, a storage device or a similar apparatus. The apparatus or the system may comprise, for example, a file server for transmitting the computer program to the receiver.

In some example implementations, a programmable logic component (for example a field programmable gate array, FPGA) can be used to carry out some or all of the functionalities of the methods described herein. In some example implementations, a field programmable gate array can interact with a microprocessor in order to carry out one of the methods described herein. The methods are generally carried out in some example implementations by any desired hardware apparatus. This may be universally usable hardware such as a computer processor (CPU) or hardware specific to the method, for example an ASIC.

The preceding disclosure provides illustrations and descriptions, but the intention is not for the disclosure to be exhaustive or for the implementations to be restricted to the precise form disclosed. Modifications and variations are possible with regard to the above disclosure or can be obtained from the practice of the implementations. Although certain combinations of features are cited in the patent claims and/or disclosed in the description, there is no intention for these features to restrict the disclosure of possible implementations. In fact, numerous ones of these features can be combined in ways which are not specifically cited in the patent claims and/or disclosed in the description. Although any of the dependent patent claims cited below possibly depends directly only on one or a number of patent claims, the disclosure of possible implementations comprises any dependent patent claim in combination with all other patent claims in the set of patent claims.

The examples described above are only representative of the principles of the present disclosure. It should be understood that modifications and variations of the arrangements and details described are obvious to experts. The intention is therefore for the disclosure to be limited only by the accompanying patent claims and not by the specific details which are stated for the purpose of describing and explaining the examples.

LIST OF REFERENCE SIGNS

10 Apparatus for determining an item of position information
11A First periodic measurement signal
11B Second periodic measurement signal
13A First assigned calibration function
15 Processing unit
19 Position information
20 Magnetic field transducer
21 Magnetic ring
22 Shaft
24 Axis of rotation
26 Thickness of the air gap
28 z offset
51A First weighting function
51B Second weighting function
60 Position sensor
61 Measurement unit
800 Method for determining an item of position information
810 Determination of the Fourier coefficients
820 Determination of the position information
900 Method for determining an item of position information
910 Calibration
911 Collection of a plurality of ADC values
912 Calculation of optimum signal coefficients
920 Compensation
921 Collection of a set of ADC values
922 Estimation of the angle
930 Calculation of the angle during switching-on

The invention claimed is:

1. An apparatus comprising apparatus, comprising:
a processing unit configured to:
determine an item of position information relating to a position of a magnetic field transducer relative to a position sensor, wherein the position sensor is configured to generate at least one periodic measurement signal when the magnetic field transducer moves relative to the position sensor,
wherein the position information is determined based on a respective measurement signal value of a respective periodic measurement signal using a calibration function assigned to the respective periodic measurement signal,
wherein the assigned calibration function represents the respective periodic measurement signal using a Fourier series having a respective plurality of Fourier coefficients which differ from zero and are of an order greater than zero, and
wherein the Fourier coefficients are determined based on a respective multiplicity of measurement signal values of the respective periodic measurement signal, and
solve the assigned calibration function for the respective measurement signal value in order to determine the position information.

2. The apparatus as claimed in claim 1, wherein the processing unit is configured to use a previous position information to determine the position information using the assigned calibration function.

3. The apparatus as claimed in claim 2, wherein the processing unit is configured to iteratively adapt a respective estimated value based on the previous position information in order to reduce a distance between the respective measurement signal value and a respective value of the assigned calibration function at the position of the respective estimated value and to determine the position information based on the respective estimated value.

4. The apparatus as claimed in claim 3, wherein the processing unit is configured to adapt the respective estimated value according to a Newton method or another approximation method.

5. The apparatus as claimed in claim 1, wherein the assigned calibration function comprises the Fourier series in a representation simplified using trigonometric methods.

6. The apparatus as claimed in claim 1,
wherein the at least one periodic measurement signal comprises a first periodic measurement signal and a second periodic measurement signal, wherein the first periodic measurement signal and the second periodic measurement signal have a standard period length, and wherein a phase of the second periodic measurement signal is shifted with respect to a phase of the first periodic measurement signal.

7. The apparatus as claimed in claim 6, wherein the processing unit is configured to:

iteratively adapt a first estimated value and a second estimated value based on previous position information in order to reduce a distance between the respective measurement signal value and a respective value of the assigned calibration function for the respective estimated value, and weight the first estimated value and the second estimated value in order to determine the position information.

8. The apparatus as claimed in claim 7, wherein the processing unit is configured to weight the first estimated value and the second estimated value based on a respective gradient of the assigned calibration function at the position of the respective estimated value, wherein the greater respective gradient, the greater a respective weighting is for the first estimated value and the second estimated value.

9. The apparatus as claimed in claim 7, wherein the processing unit is configured to determine the previous position information based on a first measurement signal value of the first periodic measurement signal and based on a second measurement signal value of the second periodic measurement signal using an arc tangent function when the apparatus is switched on.

10. The apparatus as claimed in claim 9, wherein the processing unit is configured to use the position information determined last as the previous position information after the apparatus has been switched on.

11. The apparatus as claimed in claim 1, further comprising:

a calibration unit, wherein the calibration unit is configured to determine the Fourier coefficients of the assigned calibration function based on the respective multiplicity of measurement signal values of the respective periodic measurement signals.

12. The apparatus as claimed in claim 11, wherein the calibration unit is configured to also determine the Fourier coefficients of the assigned calibration function based on a multiplicity of reference position values, wherein a reference position value is respectively assigned to a measurement signal value of the multiplicity of measurement signal values of one or more of the at least one periodic measurement signal.

13. The apparatus as claimed in claim 12, wherein the calibration unit is configured to determine the multiplicity of reference position values based on information relating to a speed of a relative movement and based on an evaluation of a period length of the at least one periodic measurement signal.

14. The apparatus as claimed in claim 12, wherein the calibration unit is configured to determine the multiplicity of reference position values using reference position information provided by a decoder, wherein the decoder is configured to determine the reference position information based on a relative movement.

15. The apparatus as claimed in claim 11, wherein the calibration unit is configured to determine the Fourier coefficients of the assigned calibration function using a discrete Fourier analysis.

16. A position sensor comprising:

a measurement unit configured to generate at least one periodic measurement signal when a magnetic field transducer moves relative to the position sensor, and an apparatus for determining the position information as claimed in claim 1 in order to determine the position information based on the at least one periodic measurement signal.

17. The position sensor as claimed in claim 16, wherein the position sensor has an integrated circuit, and wherein the integrated circuit comprises the measurement unit and the apparatus for determining the position information.

18. The position sensor as claimed in claim 16, wherein a first integrated circuit comprises the measurement unit, and wherein a second integrated circuit comprises the apparatus for determining the position information.

19. The position sensor as claimed in claim 16, wherein the magnetic field transducer has a magnetic ring which is arranged around an axis of rotation and has magnetic poles which alternate in a radial direction, and wherein the measurement unit has a magnetic field sensor which is stationary with respect to a rotation of the magnetic ring around the axis of rotation.

20. A method for determining position information relating to a position of a magnetic field transducer relative to a position sensor, wherein the position sensor is configured to generate at least one periodic measurement signal when the magnetic field transducer moves relative to the position sensor, wherein the method comprises:

determining the position information based on a respective measurement signal value of a respective periodic measurement signal using a calibration function assigned to the respective periodic measurement signal, wherein the assigned calibration function represents the respective periodic measurement signal using a Fourier series having a respective plurality of Fourier coefficients which differ from zero and are of an order greater than zero, wherein the determination of the position information comprises solving the assigned calibration function for the respective measurement signal value; and determining the Fourier coefficients based on a respective multiplicity of measurement signal values of the respective periodic measurement signal.

21. A non-transitory computer-readable medium that stores a computer program having a program code for carrying out the method as claimed in claim 20 when the program runs on a computer.

* * * * *

UNITED STATES PATENT AND TRADEMARK OFFICE
CERTIFICATE OF CORRECTION

PATENT NO. : 11,788,864 B2  
APPLICATION NO. : 17/247146  
DATED : October 17, 2023  
INVENTOR(S) : Manuel Gillinger Page 1 of 1

It is certified that error appears in the above-identified patent and that said Letters Patent is hereby corrected as shown below:

In the Claims

Claim 1:
Column 18, Line 20, change "1. An apparatus comprising apparatus, comprising:" to -- 1. An apparatus comprising: --

Claim 2:
Column 18, Line 46, change "processing unit is configured to use a previous position" to -- processing unit is configured to use previous position --

Signed and Sealed this  
Fifth Day of December, 2023

Katherine Kelly Vidal  
*Director of the United States Patent and Trademark Office*